United States Patent [19]

Wong

[11] Patent Number: 5,125,800
[45] Date of Patent: Jun. 30, 1992

[54] PORTABLE ELECTRIC AIR COMPRESSOR FOR AUTOMOTIVE VEHICLE

[76] Inventor: Alex Y. K. Wong, Room 501, Hong Kong Worsted Mills Industrial Building, 31-39 Wo Tong Tsui Street, Kwai Chung, New Territories, Hong Kong

[21] Appl. No.: 572,844

[22] Filed: Aug. 24, 1990

[51] Int. Cl.⁵ .............................................. F04B 49/08
[52] U.S. Cl. ........................................ 417/26; 417/44
[58] Field of Search .................. 417/26, 28, 38, 44; 137/224; 152/415

[56] References Cited

U.S. PATENT DOCUMENTS

| 4,080,105 | 3/1978 | Connell | 417/26 |
| 4,476,889 | 10/1984 | Haynes et al. | 417/26 X |
| 4,776,766 | 10/1988 | Brent | 417/44 |

FOREIGN PATENT DOCUMENTS

| 306398A | 3/1930 | United Kingdom |
| 331777A | 7/1930 | United Kingdom |
| 429721A | 6/1935 | United Kingdom |
| 2157775 | 10/1985 | United Kingdom |

Primary Examiner—Leonard E. Smith
Attorney, Agent, or Firm—Fredrikson & Byron

[57] ABSTRACT

A vehicle compressor unit having an adjustable outlet pressure at which it will be de-activated. A compressor is operated by an electric motor from the vehicle's electrical supply. A pressure release valve detects the pressure from the outlet of the compressor, the valve being spring loaded and the force on the spring being adjustable to vary and pre-set the pressure which the valve releases. An enclosure into which air releases when the valve releases. Electrical contact means movable by the release of air into the enclosure to de-activate the motor at that pre-selected pressure.

2 Claims, 3 Drawing Sheets

PORTABLE ELECTRIC AIR COMPRESSOR FOR AUTOMOTIVE VEHICLE

This invention relates to vehicle accessories and in particular an air compressor for inflating or re-inflating the pneumatic tires of vehicles.

BACKGROUND TO THE INVENTION

Such compressors are well-known and generally comprise an electric motor which drives a suitable air compressor using the electrical energy from the vehicle's own electrical supply system. This is usually achieved by means of a plug which can fit into the cigar lighter of a vehicle to connect the compressor to the vehicle's battery.

A pressure gauge can be provided on the outlet line from the compressor so that the user can judge the air pressure which the tire is being inflated. This requires careful attention on the part of the user, however, to watch the pressure and ensure that he stops the inflation at the right moment.

It is an object of the present invention to avoid this problem and to allow the user to pre-set a desired inflation pressure and have the compressor stop at that point.

BRIEF SUMMARY OF THE INVENTION

According to the invention, there is provided a vehicle compressor comprising an electrically operated compressor, means for driving the compressor from the vehicle's electrical supply, an outlet line from the compressor to a vehicle tire, an adjustable pressure release valve in the said outlet line capable of releasing air from the line once a pre-set pressure has been reached on that line, and means for detecting the release of pressure by the valve and de-activating the compressor as a result.

With such an arrangement, the user can pre-set a desired inflation pressure and once this is reached, the device will automatically stop at that point.

The pressure release valve can comprise a spring loaded plunger closing an inlet from the output supply, the load on the spring being adjustable so as to pre-set the pressure at which the valve will release. Then that valve may be placed in the sealed enclosure such that release of air into that enclosure by lifting of the valve will cause a flow of air out from the sealed enclosure which will in turn actuate an electrical contact. Then the completion of the circuit by that electrical contact can be used to de-activate the motor. By way of an example, this can be achieved using a relay whose coil becomes energised by the completion of a circuit by the contact and coil can flow to switch contact and retain the energisation of the coil until the user is ready to start the operation again.

The invention also extends to the pressure release valve arrangement itself.

BRIEF DESCRIPTION OF THE DRAWINGS

The invention will now be described, by way of an example, with reference to the accompanying drawings, in which.

DESCRIPTION OF THE PREFERRED EMBODIMENTS

Figure 1:
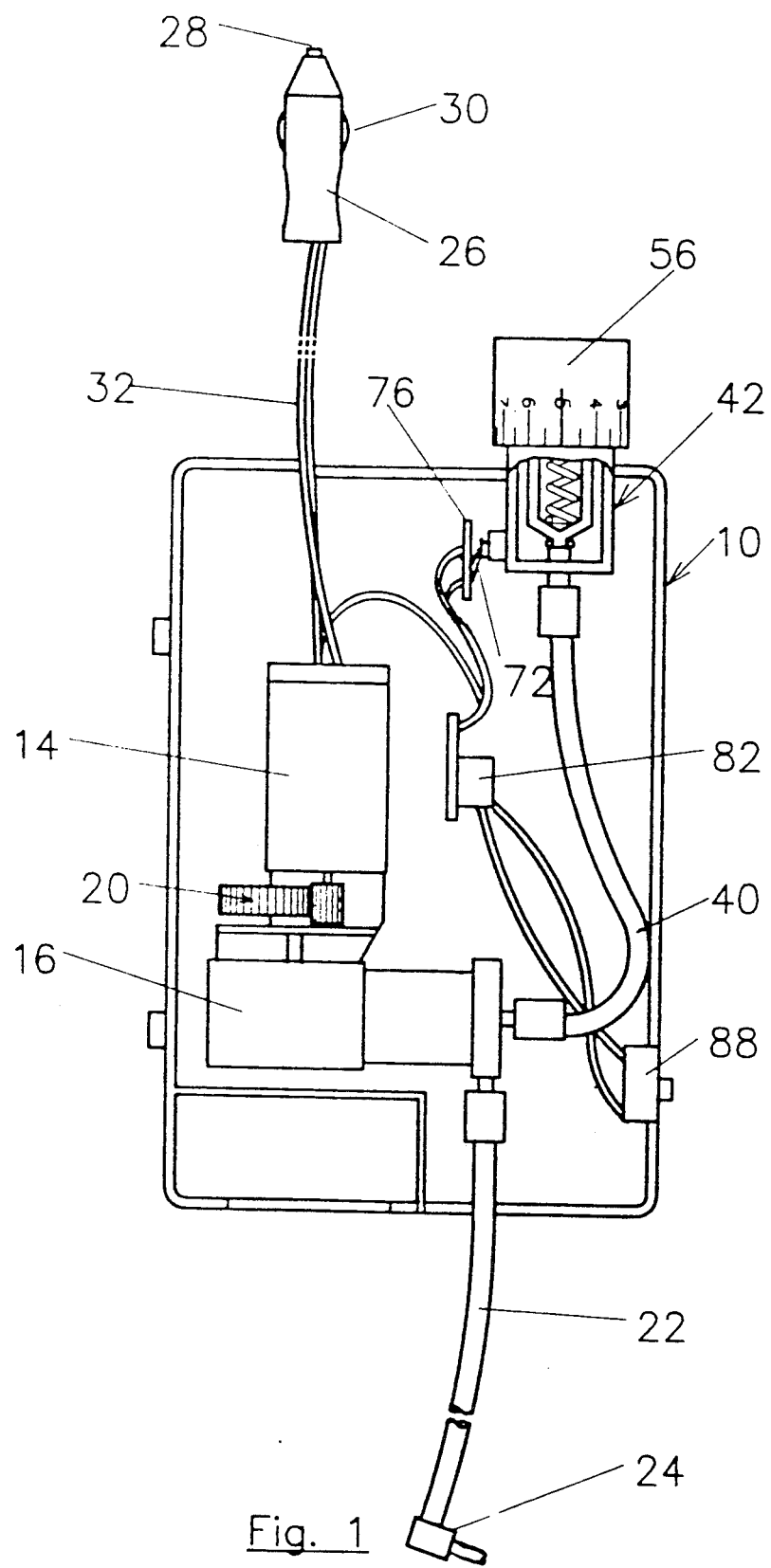
FIG. 1 is a diagrammatic view of a car tire compressor according to the invention.

The car compressor unit 10 as shown in the drawings includes an outer casing 12 in which is housed an electrical motor 14 driving a compressor 16. The motor drives the compressor through a reduction gear box 20 (not shown in detail) and the motor and compressor unit are well-known from widely used car compressor units of this type and are not believed to need further explanation or description.

The compressor has an outlet tube 22 on the end of which is a conventional fitting 24 for attachment to a pneumatic tire. When the compressor operates therefore and the fitting is attached to the tire, the tire can be inflated.

The electric motor 14 is actuated for vehicle's cigar lighter and includes a plug 26 of conventional construction. This has a central resilient contact 28 and constituting a first terminal, and a radially resilient contact 30 constituting a second terminal, for obtaining the supply of electrical energy from the vehicle's battery. Plug 26 is attached to the unit 12 by means of an electrical cord 32.

Figure 2:
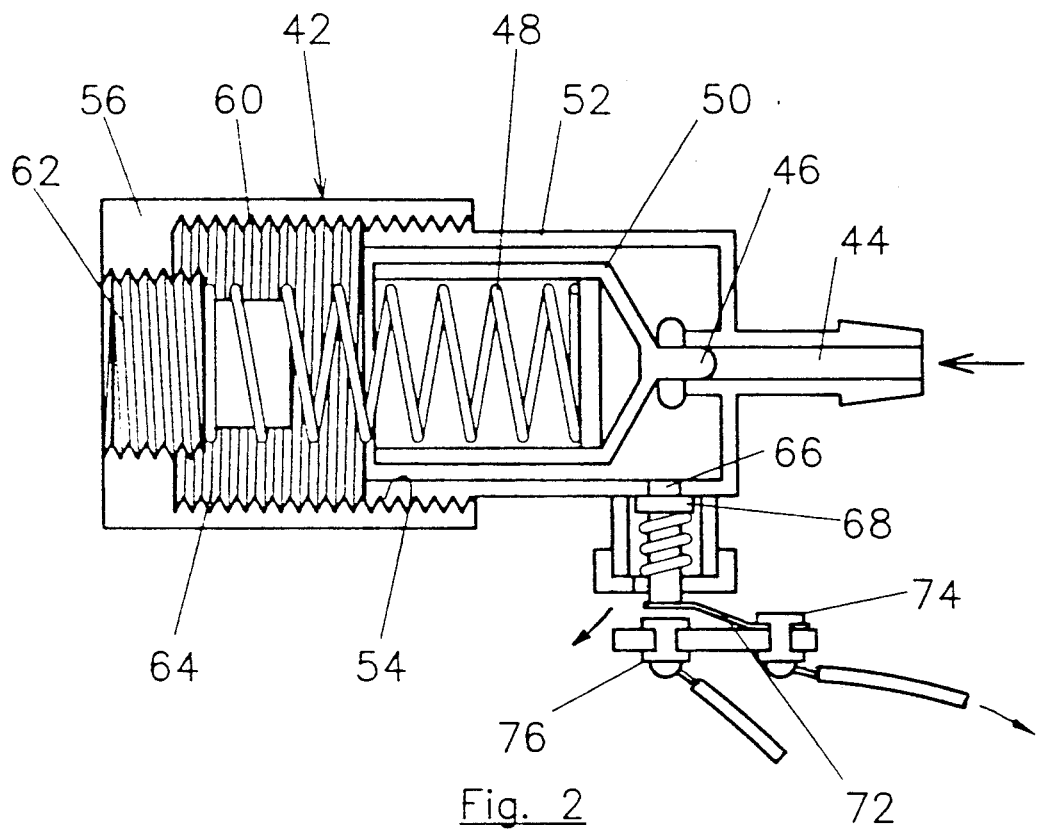
FIG. 2 is an enlarged detail showing the pressure release valve.
Figure 4:
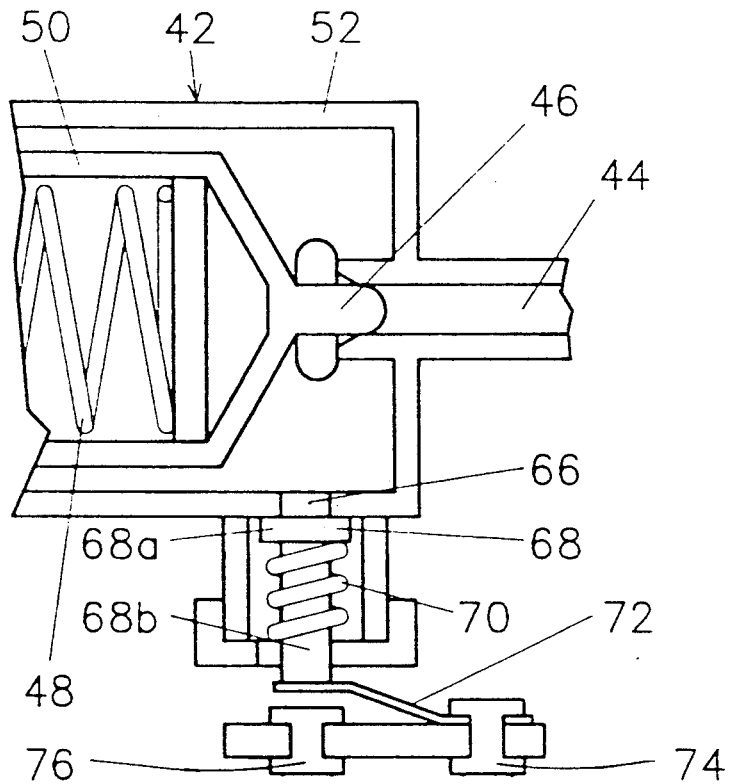
FIG. 4 is a further enlarged detail of the pressure release valve in its closed position.
Figure 5:
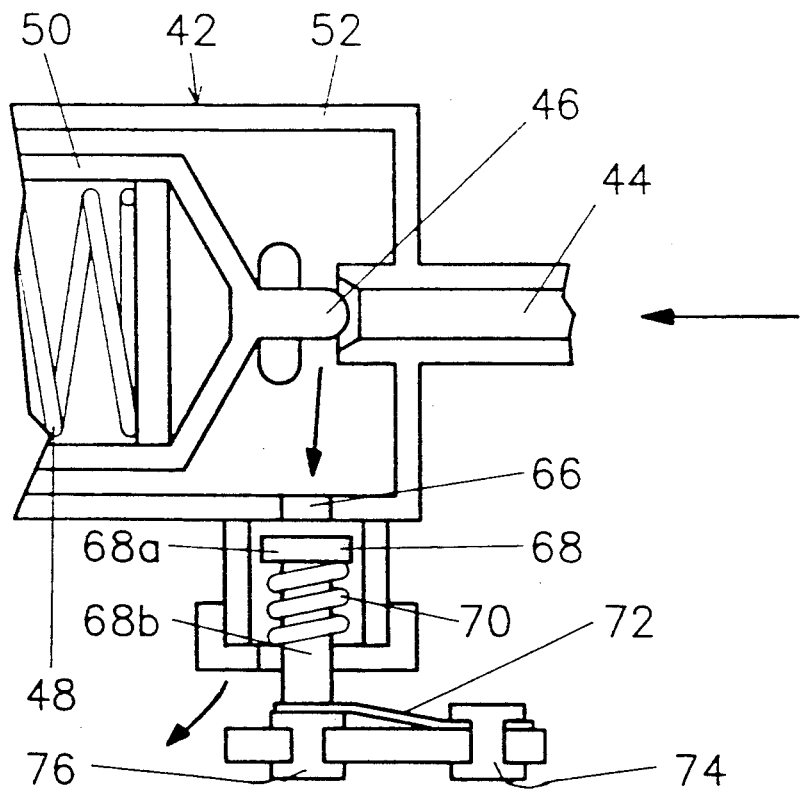
FIG. 5 is a view similar to FIG. 4 of the valve when actuated.

A branch tube 40 extends from the compressor outlet to a pressure detection valve unit 42. This unit is best shown in FIG. 2 and includes an inlet connector 44 attached to the tube 40 whose end is closed by a valve pin 46. This sits tightly in the end of the inlet 44 and is urged tightly into the inlet 44 by a spring 48. The valve pin 46 is integrally formed with a hollow cylinder 50 in which the end of the coil spring is positioned and so that the coil spring can urge the pin 50 to the right in the sense viewed in FIGS. 4 and 5 so as to close the inlet 44.

The inlet 44 forms part of a cylindrical housing 52 whose left-hand end, as seen in FIG. 2, has an outer threading 54. Threaded onto this is an end cap 56 with an inner threading 60. As best seen in FIG. 1, the outer cylindrical surface of the cap 56 has graduations corresponding to the pressure at which the valve is to operate.

Screwed into the cap 56 is a plug 62 and the left-hand end, as seen in FIG. 2, of the spring 48 is engaged by that plug. Accordingly, the further the cap 60 is screwed onto the cylinder 52, the more the spring 48 is compressed and therefore the greater the force with which the spring forces the pin 46 to close the inlet 44 and vice versa. The user can therefore dial in a required pressure by twisting the cap 56 and reading the pre-set pressure from the graduations on the cap. Then when the pressure in the inlet 44 reaches that pre-set position, it will have sufficient force to overcome the force of the spring 48 and the pin 46 will be moved to the left and is shown in FIG. 2 against the action of spring 48.

The cap 56 defines with the cylinder 52 an enclosed a space 64 from which there is only one outlet, namely an outlet opening 66. This opening is normally closed by means of a valve 68. The latter is in the form of a flat head 68a with an integral shaft 68b. A coil spring 70 urges the head 68a into a sealing position with the outlet 66. The spring however does not need to be particularly strong or accurately calibrated since its objective is solely to keep the head 68a normally against the inlet 66 and to close it. However, once pressurized air escapes from the inlet 44 because the pin 46 is displaced, the resulting air will readily overcome the force of the spring 70 and escape through the opening outlet 66 so moving the valve 68.

The shaft 68b is in contact with a resilient electrical arm 72. This arm originates from one contact 74, and insulated from the contact 74 is a second contact 76. As soon as the valve 68 lifts however, the shaft 68b presses the arm 72 into electrical contact with the contact 76.

Figure 3:
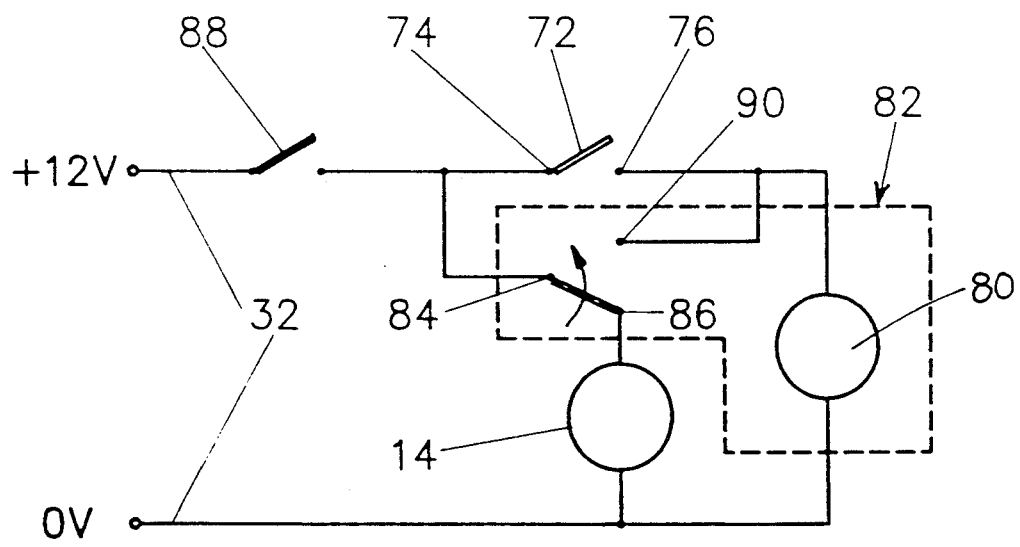
FIG. 3 is a circuit diagram of the wiring in the compressor.

Referring to FIG. 3, as soon as the arm 72 completes the circuit with the contact 76, current is supplied to the coil 80 of a solenoid 82. The solenoid 82 controls a switch contact 84. This is normally in the "off" position and completes, via a contact 86, the circuit to the electric motor 14. Accordingly as soon as an on/off switch 88 is actuated the motor will work. However once the solenoid coil 80 is energised as described above, it will move the switch 84 to the contact 90, so opening the circuit to the motor and de-energising it. Now even though the arm 72 ceases to make contact with the contact 76, the circuit to the solenoid coil 80 is still completed through the switch 84 and contact 90.

Therefore when a pre-set pressure is reached and the pin 46 raises, air will release through the outlet 66 so displacing the valve 68a, momentarily at least causing the arm 72 to contact the contact 76. This energises the coil 80 and immediately de-activates the motor and therefore stops further pressurization of the tire. Also this maintains the energisation of the coil 80 via the switch 84 and contact 90 so preventing the switch 84 returning to re-energise the motor.

If the user has then finished he can un-couple the plug 26 from the car and this will cause the de-energisation of the coil 80, so releasing the switch 84 and re-setting this ready for use. As an alternative if the user wishes to inflate another tire, he merely has to operate the on/off switch 88 which then automatically re-sets everything ready to inflate the new tire.

The pressure to which the tire is to be inflated can very quickly and easily be pre-selected by rotating the cap 56 to the desired pressure release value.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

I claim:
1. A vehicle compressor device comprising:
   a compressor;
   an electric motor to drive the compressor;
   electrical supply means for driving the motor and for attachment to the vehicle's electrical supply;
   output supply means from the compressor for attachment to a vehicle tire to inflate the tire;
   pressure release valve means subject to the output pressure from the compressor;
   manually controlled means for adjusting and presetting the pressure at which the pressure release valve means release;
   an enclosure into which air from the pressure release valve releases;
   a single outlet from the enclosure;
   a movable enclosure for the outlet;
   resilient means urging the enclosure to close the outlet, the closure being movable from the closed position by air released into the enclosure when the pressure release valve means release;
   normally open electrical contact means engagable by the movable closure when the movable closure moves from its closed position, the engagement of the contact means upon movement of the contact means closing the electrical contact means; and
   relay means including a coil and a switch contact movable by energization of the coil from a first position to a second position, the switch contact in the first position energizing the motor and the switch contact in the second position de-energizing the motor and energizing the coil; closing of the electrical contact means upon engagement by the movable closure completing a circuit to energize the coil, whereupon the switch contacts deactivate the motor and also maintain energization of the coil.

2. A device according to claim 1 in which the enclosure comprises:
   a cylindrical housing;
   an end cap threaded to the housing; and
   spring means urged by the end cap against the valve means, whereby rotation of the end cap relative the housing adjusts the force of the spring means, thereby adjusting the pressure at which the valve means release.

* * * * *